United States Patent [19]

Keene et al.

[11] Patent Number: 5,835,960
[45] Date of Patent: Nov. 10, 1998

[54] APPARATUS AND METHOD FOR INTERFACING A PERIPHERAL DEVICE HAVING A ROM BIOS TO A PCI BUS

[75] Inventors: David Keene, San Mateo; Vahid R. Hashemi, Milpitas, both of Calif.

[73] Assignee: Cirrus Logic, Inc., Fremont, Calif.

[21] Appl. No.: 762,225

[22] Filed: Dec. 9, 1996

Related U.S. Application Data

[63] Continuation of Ser. No. 178,942, Jan. 7, 1994, abandoned.

[51] Int. Cl.$^6$ ............................. G06F 12/04; G06F 13/40
[52] U.S. Cl. ............................ 711/172; 711/211; 395/307
[58] Field of Search .................................. 395/306, 307, 395/421.02, 421.01; 711/211, 212, 170, 171, 172

[56] References Cited

U.S. PATENT DOCUMENTS

| | | | |
|---|---|---|---|
| 4,214,302 | 7/1980 | Schmidt | 395/500 |
| 4,245,300 | 1/1981 | Kaufman et al. | 395/821 |
| 4,275,455 | 6/1981 | Bartlett | 364/130 |
| 4,447,876 | 5/1984 | Moore | 395/500 |
| 4,467,447 | 8/1984 | Takahashi et al. | 395/847 |
| 4,490,785 | 12/1984 | Strecker et al. | 395/308 |
| 4,514,808 | 4/1985 | Murayama et al. | 395/307 |
| 4,523,276 | 6/1985 | Maejima e al. | 711/100 |
| 4,569,018 | 2/1986 | Hummel et al. | 711/207 |
| 4,590,556 | 5/1986 | Berger et al. | 395/651 |
| 4,593,267 | 6/1986 | Kuroda et al. | 341/67 |
| 4,633,437 | 12/1986 | Mothersole et al. | 395/894 |
| 4,677,548 | 6/1987 | Bradley | 395/500 |
| 4,716,527 | 12/1987 | Graciotti | 395/307 |
| 4,736,317 | 4/1988 | Hu et al. | 711/214 |
| 4,766,538 | 8/1988 | Miyoshi | 395/307 |
| 4,831,514 | 5/1989 | Turlakov et al. | 395/500 |
| 4,845,611 | 7/1989 | Turlakov et al. | 395/873 |
| 4,860,198 | 8/1989 | Takenaka | 395/307 |
| 5,043,877 | 8/1991 | Berger et al. | 395/290 |
| 5,109,332 | 4/1992 | Culley | 395/307 |
| 5,113,369 | 5/1992 | Kinoshita | 395/307 |
| 5,113,497 | 5/1992 | Dewa | 395/836 |
| 5,125,084 | 6/1992 | Begun et al. | 395/800.33 |
| 5,241,631 | 8/1993 | Smith et al. | 395/306 |
| 5,255,374 | 10/1993 | Aldereguia et al. | 395/293 |
| 5,261,068 | 11/1993 | Gaskins et al. | 711/157 |
| 5,280,598 | 1/1994 | Osaki et al. | 395/307 |
| 5,301,281 | 4/1994 | Kennedy | 395/307 |
| 5,428,763 | 6/1995 | Lawler | 395/307 |
| 5,446,904 | 8/1995 | Belt et al. | 395/750.05 |
| 5,448,521 | 9/1995 | Curry et al. | 365/189.02 |
| 5,586,294 | 12/1996 | Goodwin et al. | 74/137 |

OTHER PUBLICATIONS

Trident TVGA9000 Technical Reference Manual.

*Primary Examiner*—Eddie P. Chan
*Assistant Examiner*—Kevin L. Ellis
*Attorney, Agent, or Firm*—Lowe, Price, LeBlanc, & Becker; Robert P. Bell; Steven A. Shaw

[57] ABSTRACT

An apparatus and method for providing a conversion technique to allow an eight bit ROM BIOS to be read on a 32 bit PCI bus. A separate address port for the ROM BIOS is provided which is not connected to the PCI bus. The conversion bus takes data from the ROM BIOS at a separate data port, assembles four cycles of eight bits in a 32 bit fashion and delivers that data to the PCI bus. When the PCI bus requests 4 bytes, the system of the present invention assembles 4 bytes from the 8 bit data and transmits that data to the PCI bus as a 32 bit quantity.

37 Claims, 12 Drawing Sheets

APPARATUS AND METHOD FOR INTERFACING A PERIPHERAL DEVICE HAVING A ROM BIOS TO A PCI BUS

This application is a continuation of application Ser. No. 08/178,942 filed Jan. 7, 1994, now abandoned.

TECHNICAL FIELD

The present invention relates to a method and apparatus for interfacing a ROM BIOS to a system bus having a data width greater than the memory width of the ROM BIOS. The invention has particular application to a high performance VGA controller having a 32 bit local bus interface supporting both PCI and VESA local bus architectures.

BACKGROUND ART

After the development of the IBM™ PC-AT, independent computer developers created a standard PC bus architecture known as the ISA or Industrial Standard Architecture bus. This bus architecture, along with the subsequently developed EISA or Extended Industrial Standard Architecture, have become industry standards for IBM™ compatible PCs. Unfortunately, the ISA bus, using 16 data lines, could only access up to 8 megabytes of data per second, or with 24 data lines, up to 16 megabytes per second.

For high performance graphics applications, such data rates may be too slow, and thus the ISA architecture has become a bottleneck for transmitting data to and from high performance graphics controllers (e.g., VGA controllers). In addition, the traditional ISA bus, when used as an expansion bus, may be difficult and cumbersome to configure. Individual expansion cards may require manually setting jumpers or DIP switches, making installation more difficult for the average PC user.

So-called "local" buses have recently been developed in an attempt to overcome the difficulties with the ISA bus. A local bus allows a peripheral device to take advantage of the higher data transmission bandwidth available directly from the CPU. A local bus may be as wide as 64 bits and is able to directly access the CPU and thus have a much higher data transmission bandwidth. As such, a local bus architecture has been desirable for use in high resolution and high speed graphics applications.

The first of these local bus architectures, the VESA or VL bus, has met with some success. VESA, or Video Extension Standards Association, specifies a 32 bit local bus interface which is an expansion bus that can be placed on a mother board allowing a user to plug in an expansion card in a similar manner as an ISA bus card to provide system graphics, I/O, SCSI, or the like. The VESA bus, however, has a greater data transmission bandwidth than the ISA bus. The raw bandwidth on a VESA bus, for example, at 50 MHz CPU speed would be approximately 100 megabytes per second.

However, the VESA or VL bus standard has been supplanted by the PCI bus standard. PCI, or Peripheral Connect Interface, is a true peripheral bus. The PCI bus has at least two advantages over the VESA bus. The PCI bus has a lower pin count, achieved by multiplexing address and data information on the same bus, rather than the separate address and data lines of the VESA bus. A 32 bit bus interface can be designed on the PCI bus with 46 pins which would require 67 pins on the VESA bus. PCI also has implemented and specified auto computation, allowing a user to plug in a peripheral card without worrying about setting jumpers or DIP switches. The CPU will know what kinds of devices are on the PCI bus, and interrupts, I/O, and the like are accomplished automatically. In addition, the PCI bus has lower power requirements by using a 3.3 volt specification.

Peripheral devices may require an internal ROM BIOS which tells the CPU what type of device has been configured as a peripheral. The type of information the CPU requires from the ROM BIOS comprises a "signature" indicating to the CPU the type of peripheral configured on the PCI bus. The first 32 bit quantity from the ROM BIOS contains this signature. If that signature is not there, the CPU will not recognize the ROM BIOS, and thus not recognize the peripheral device. If the CPU recognizes the signature, it proceeds to read the rest of the ROM BIOS, which instructs the CPU how to interface with the peripheral device by programming registers, testing memory, selecting different modes, or the like. Every time the power to the CPU is turn on or a reboot occurs, the ROM BIOS is read in this manner.

One difficulty encountered with the PCI bus, however, lies in the nature of the architecture. The PCI reference 2.0 specification requires that when the bus is used as an expansion bus, it cannot have greater than one load. For example, if the peripheral device comprises a video controller, any other components associated with the video controller (e.g., VGA controller IC, graphics chip, ROM BIOS, RAMDAC, or the like) must be provided with a method of interfacing with the PCI bus such that no extra loads beyond the VGA graphics chip itself are placed on the bus. In addition, under the PCI protocol, all data transfers must be 32 bits wide. If consecutive bytes of data are to be read, they must be presented as 32 bits. Further, there is a limitation on the length of the trace link, which should normally be less than two inches.

The ROM BIOS is typically provided on a separate chip, since the contents of the ROM BIOS may be changed from time to time during the production lifetime of the peripheral device. For example, if bugs are found in the BIOS data, or if a new version or upgrade of the peripheral device is released, the contents of the ROM BIOS can be changed without having to redesign the other circuits in the peripheral device. The contents of the ROM BIOS can usually be fit within a single 8 bit EPROM of 32 kilobytes. One approach to meeting the PCI requirement of 32 bits in parallel would be to provide for EPROMS to store and deliver 32 bits in parallel. However, such an arrangement would be cost prohibitive and would still not solve the loading problem.

Figure 1:
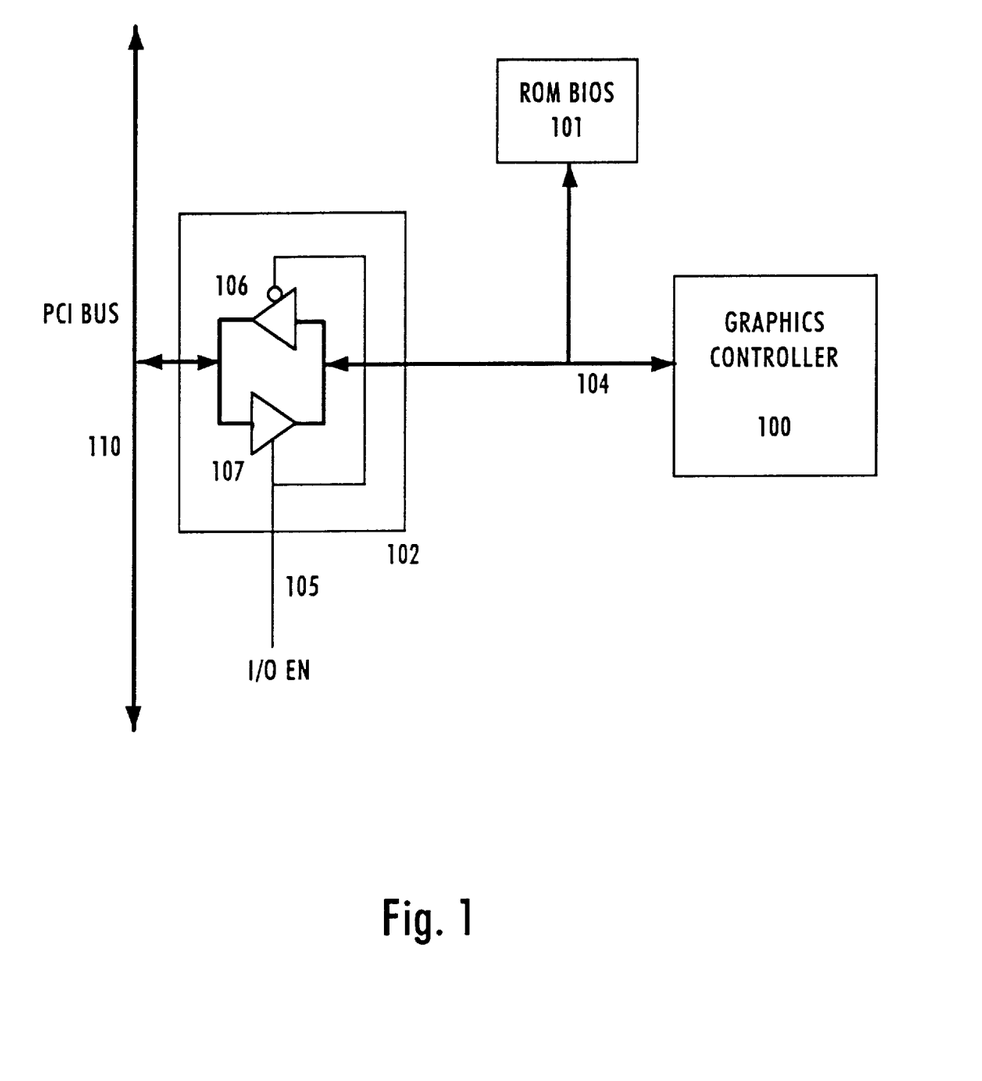
FIG. 1 is a block diagram showing a technique for interfacing an eight bit ROM BIOS with a PCI bus.

Another approach to solving this problem would be to provide an external transceiver circuit 102 as shown in FIG. 1. FIG. 1 shows the PCI bus 110 coupled to a graphics controller 100 and ROM BIOS 101 via internal bus 104 and transceiver 102. Transceiver 102 is provided with a I/O enable input 105 and tristate drivers 107 and 106. The transceiver 102 of FIG. 1 allows the 32 bit signal from PCI bus 110 to be transmitted to internal bus 104 to graphics controller 100 and ROM BIOS 101. Similarly, 32 bit signals from ROM BIOS 101 and graphics controller 100 transmitted on internal bus 104 to transceiver 102 are multiplexed into a 32 bit signal to be transmitted on PCI bus 110.

Although this approach solves the incompatibility problem by providing the only one load on PCI bus 110, the transceiver 102 still requires a 32 bit ROM BIOS 101 in order to interface with PCI bus 110. In addition, the additional components shown in FIG. 1 add to the overall cost of the peripheral device. Moreover, the setup and hold times required for such a transceiver would make the device non-compatible with the PCI bus specification.

Other techniques have been attempted to interface an eight bit ROM BIOS with a 16 bit ISA bus. One appears to use a data bus transceiver to latch one byte of data from am eight bit ROM BIOS to give a ISA bus card the effect of having a 16 bit ROM BIOS. Another lets the ROM BIOS connect directly to the bus on one byte path. This latter chip copies one byte from the ROM BIOS and presents it on the high byte data on the ISA bus to simulate 16 bit cycles to an 8 bit device.

Both of these devices appear to use a separate data path for the ROM BIOS data, which is always available to the ISA bus. Such a technique requires additional circuitry be installed in the video controller IC in order to provide this separate data path. Neither of these devices appear to take advantage of the mechanisms of the PCI bus which reads the ROM BIOS only one time (at startup or reboot) and transfers the data to system memory.

Hence, it remains a requirement in the prior art to provide a technique for allowing more than one load to be connected to a PCI bus without violating the architecture specification of the PCI bus.

DISCLOSURE OF THE INVENTION

In the present invention, a computer peripheral device comprises a bus interface having a predetermined bit width for interfacing with a host processor. A memory having a width less than the bit width of the bus interface stores BIOS information. A controller, coupled to the bus interface and the memory, receives BIOS information requests from the bus interface and retrieves the BIOS information from the memory, assembles the BIOS information retrieved from the memory into a data string having a length equal to the bit width of the bus interface and transmits the data string to the bus interface.

A method is provided for interfacing a memory having a predetermined memory width with a bus interface having a predetermined bit width greater than the memory width. An information request is received from the bus interface. At least a portion of requested information is retrieved from the memory. A determination is made whether all of the requested information responsive to the information request has been received from the memory, and the requested information retrieved from the memory is assembled into a data string having a length equal to the predetermined bit width of the bus interface. The data string is then transmitted to the bus interface.

It is an object of the present invention to interface a ROM BIOS for a peripheral device with a local bus having a data width greater than the memory width of the ROM BIOS.

It is a further object of the present invention to provide an interface for a ROM BIOS for a peripheral device with a local bus such that the ROM BIOS is not presented as a load to the local bus.

It is a further object of the present invention to provide a video controller integrated circuit which incorporates an interface for a ROM BIOS to interface the ROM BIOS with a local bus.

It is a further object of the present invention to provide a video controller IC having a memory bus for interfacing with a video memory wherein a portion of this memory bus is used as an interface for a ROM BIOS.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 2:
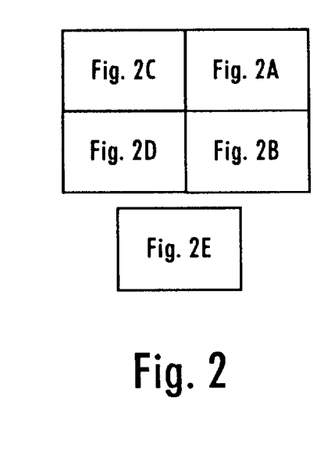
FIGS. 2–2E are a chip diagram of the video controller integrated circuit and ROM BIOS of the present invention.
Figure 2A:
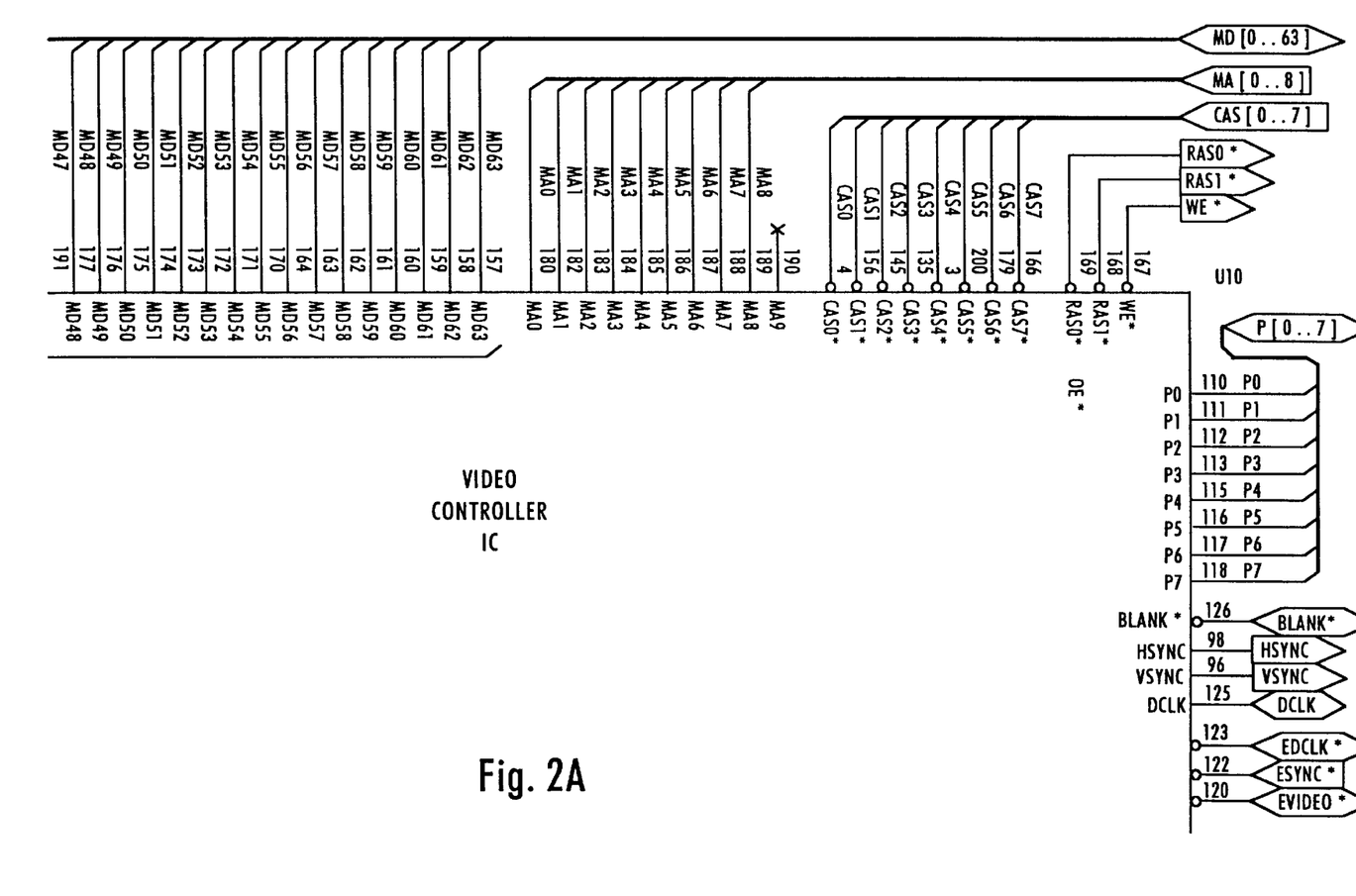
Figure 2B:
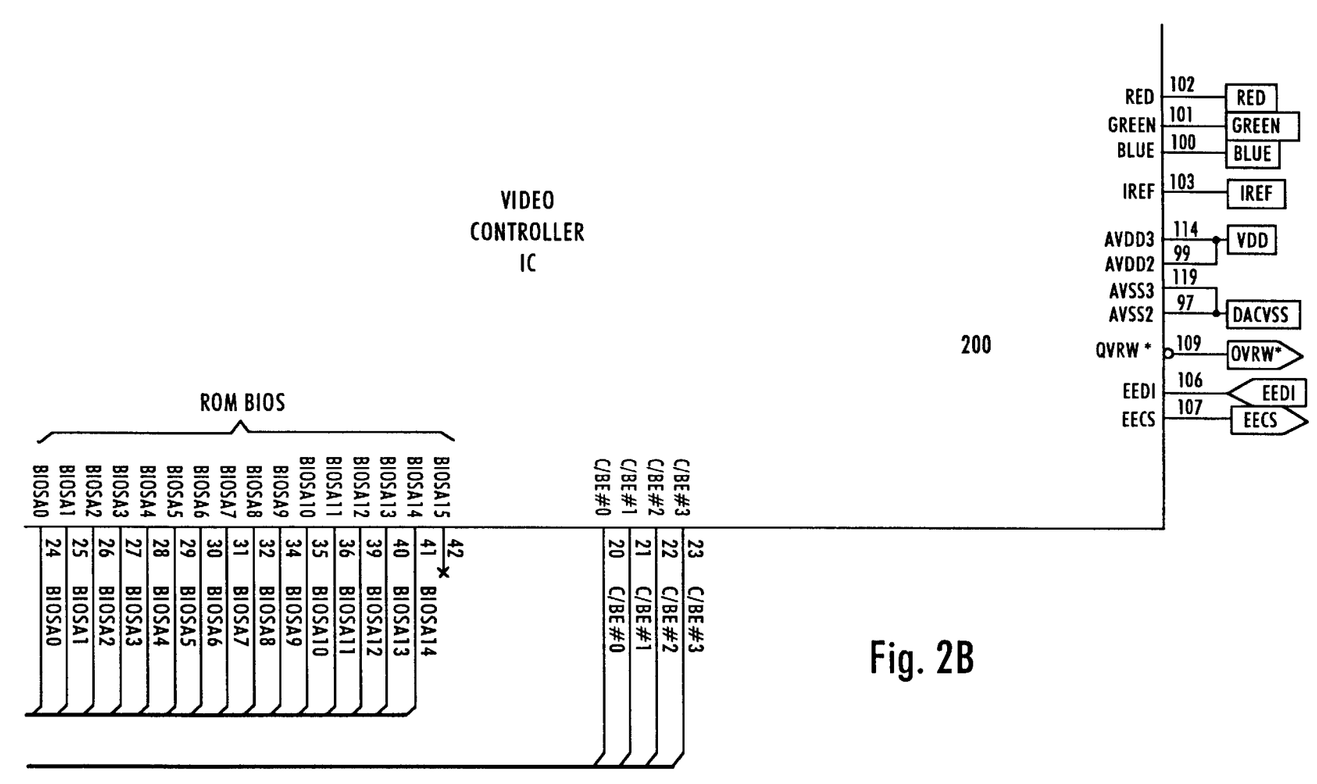
Figure 2C:
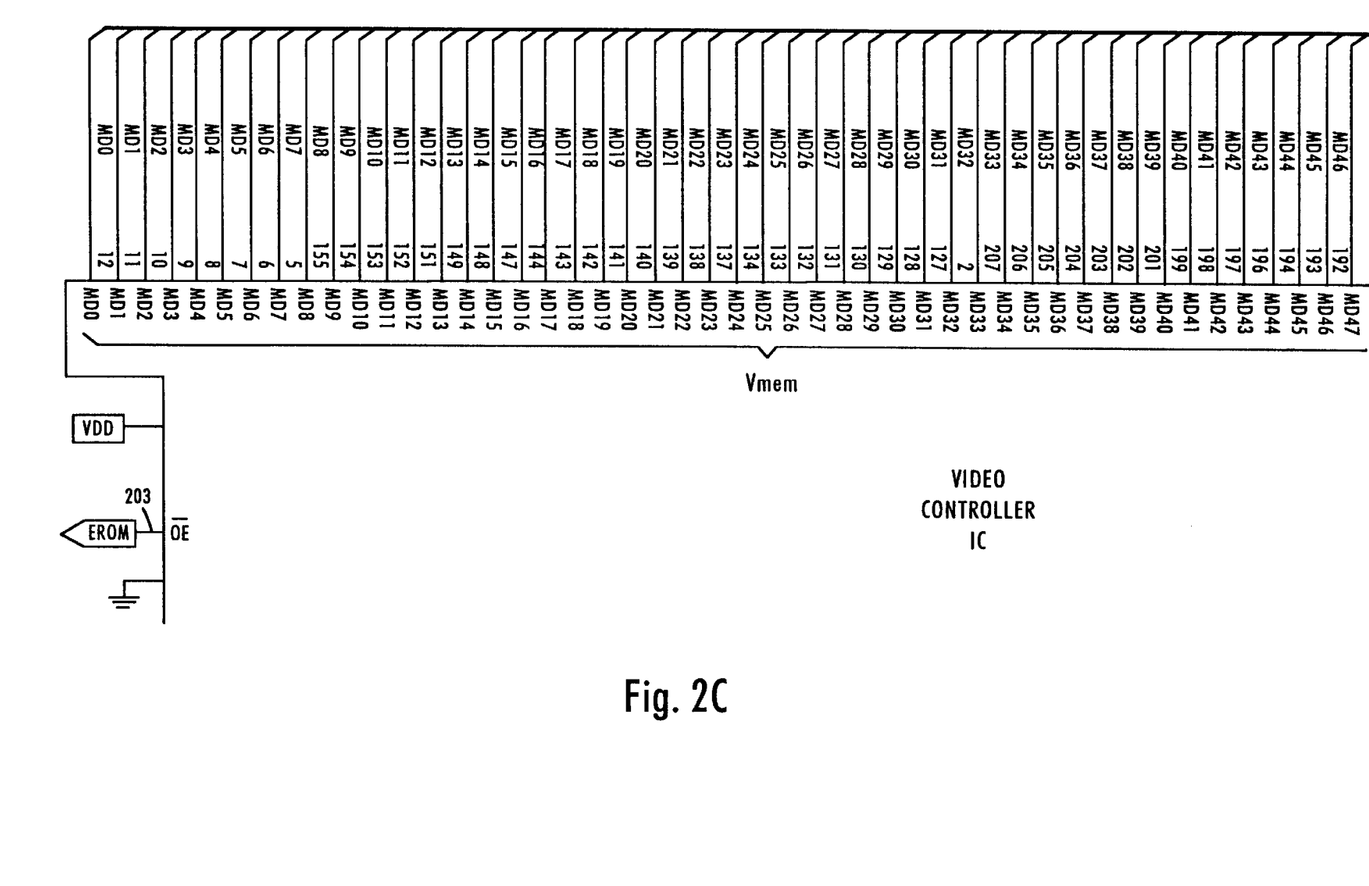
Figure 2D:
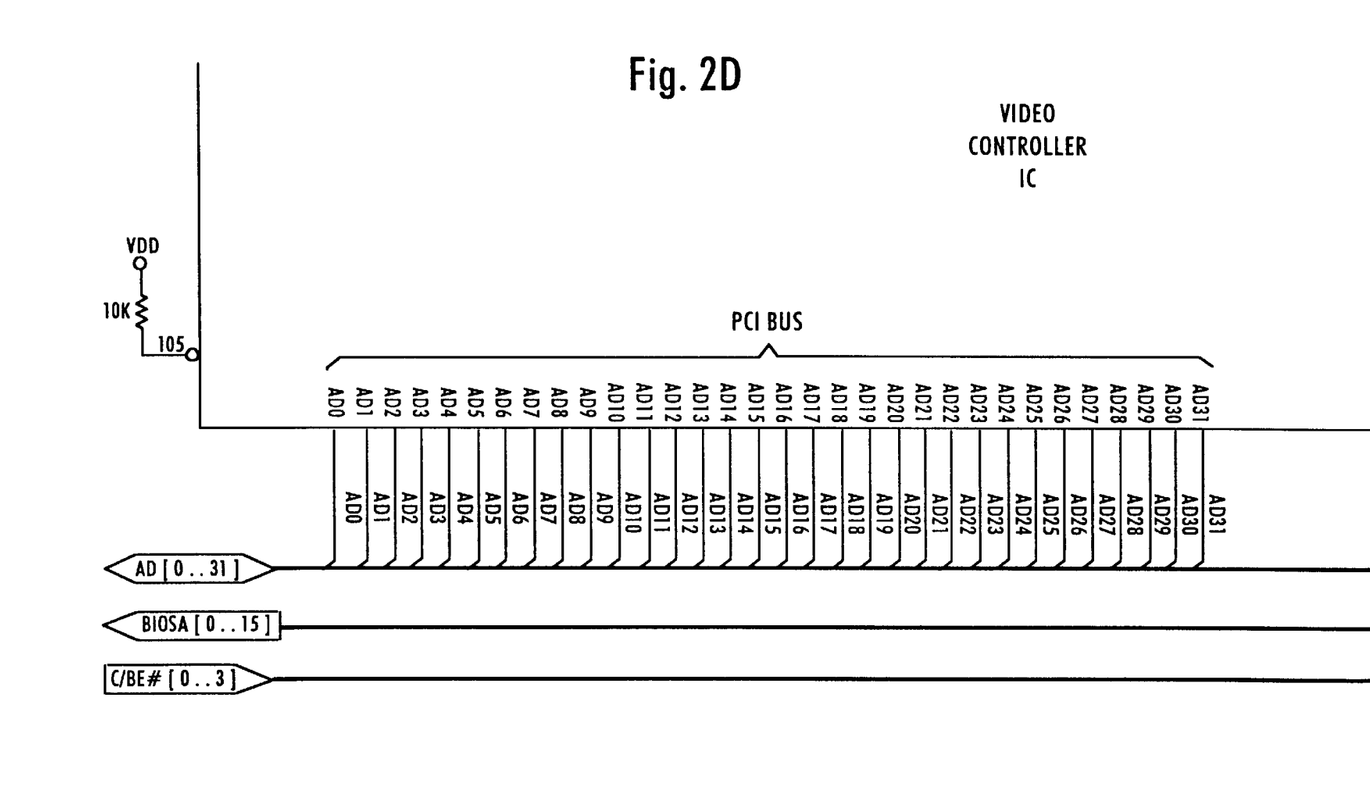
Figure 2E:
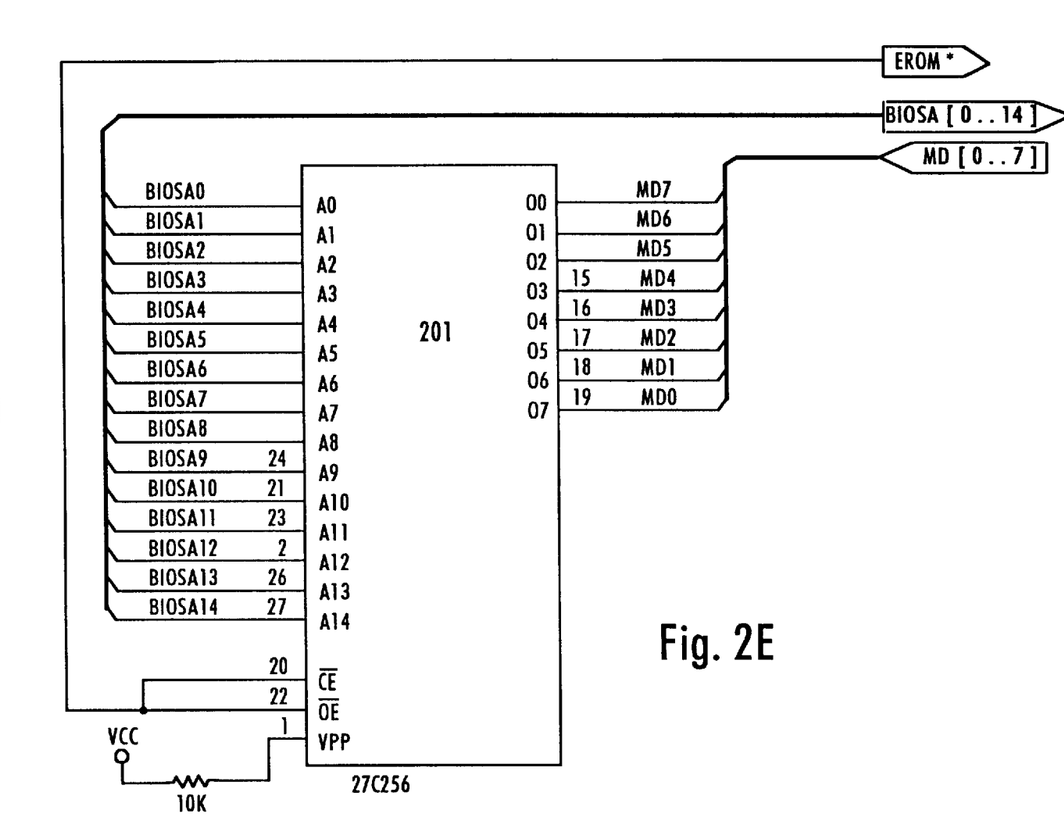
Figure 3:
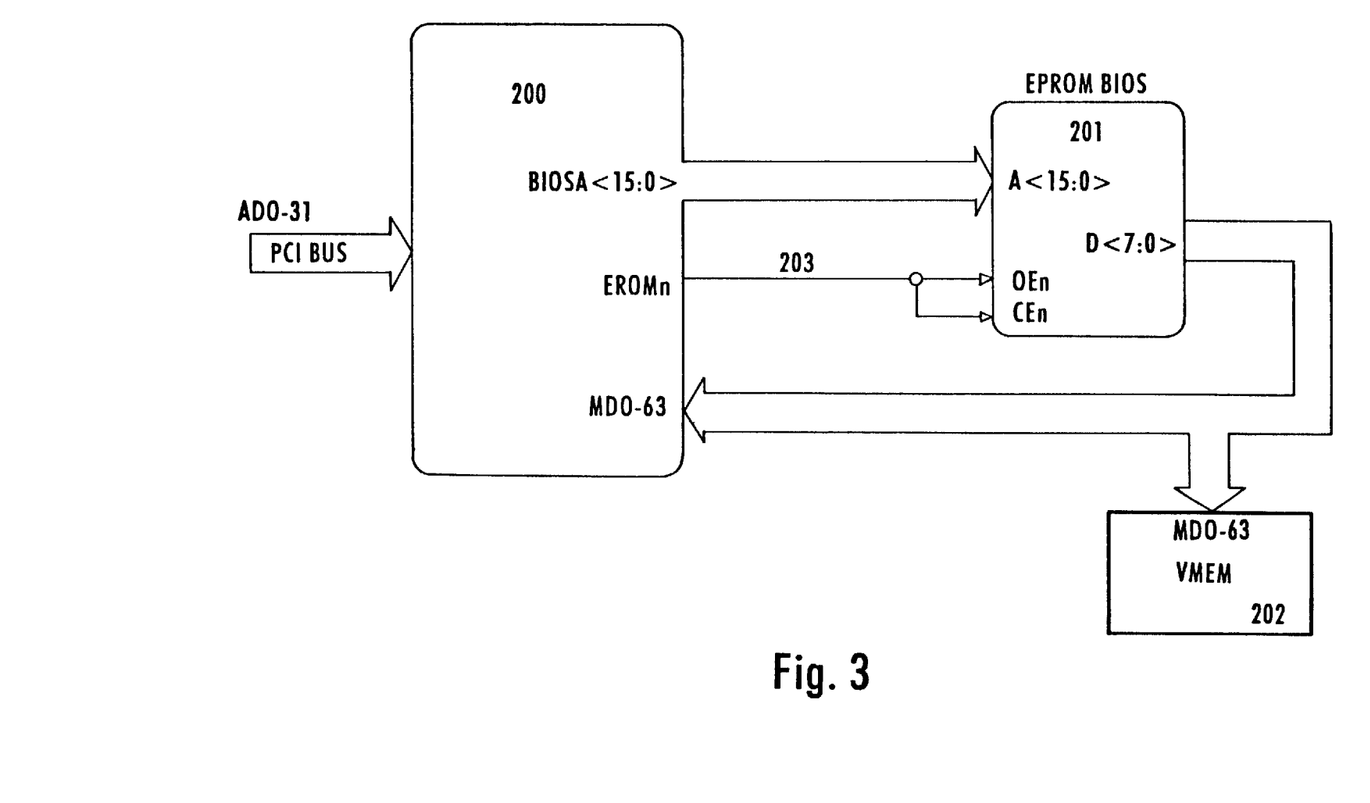
FIG. 3 is a block diagram of the chip diagram of FIG. 2.

FIGS. 2 and 3 show chip and block diagrams, respectively, of a video controller IC 200 of the present invention and a ROM BIOS 201. For the sake of clarity, not all of the pins for video controller IC 200 are shown in FIG. 2. ROM BIOS 201 is typically an EPROM, preferably an 8 bit EPROM of about 32 kilobytes. For 32 kilobytes, about 15 bits of address information are needed to address all of the bytes within the ROM BIOS 201. Fifteen bit address port BIOSA0–A14 is used from video controller IC 200 to deliver an address to ROM BIOS 201. The resultant data at that address, an 8 bit quantity, is assembled by video controller IC 200 into 4 bytes and delivered to the PCI bus.

Video controller 200 is provided with a PCI multiplexed address bus having a 32 bit address AD0 through AD31 (hereinafter PCI bus AD0–AD31). This 32 bit address bus may be interfaced with a CPU using the PCI protocol. Under the PCI bus protocol, only one load is allowed on this bus. In the present invention, video controller IC 200 comprises this one load. Video controller IC 200 is provided with a BIOS address bus comprising 16 bit addresses BIOSA0 through BIOS15. In the example shown in FIG. 2, ROM BIOS 201 comprises a 32 kilobyte EPROM. Since only 15 bits are required to address 32 kilobytes of memory, only addresses BIOSA0 through BIOSA14 are used. This BIOS address bus provides address information to ROM BIOS 201. As shown in FIG. 2, ROM BIOS 201 may comprise, for example, a 32 kilobyte EPROM (e.g., part number 27C256 or the like).

Referring to FIG. 3 of the present invention, video controller IC 200 is the only device in the video controller peripheral which appears on the PCI bus. Video controller IC 200 receives system addresses from PCI bus AD0–AD31, reads those system addresses, and compares these addresses for all of its various internal functions. If one of the system addresses received over PCI bus AD0–AD31 corresponds to a valid system address for the video controller peripheral, video controller IC 200 then reads the data or command multiplexed with that address and performs the corresponding internal function. One of these internal functions is to select the ROM BIOS 201. When the ROM BIOS 201 address space is decoded, it also supplies the system addresses that had been latched for the PCI specification to the ROM BIOS 201 through another set of pins.

Thus, the address must be latched internally within video controller IC 200 and then the data is received. In this instance, the ROM BIOS address comprises 15 bits, BIOS<15:0> to address a possible 32 kilobytes of memory. These 15 bits of address are latched and presented to ROM BIOS 201. ROM BIOS 201 then decodes the 15 bit address, but now needs data pins to read the data from the ROM BIOS 201 to output to video controller IC 200. However, since ROM BIOS 201 is read before the graphics chip is initialized or is actually being used, a portion of the ordinary DRAM memory data interface MD0–MD63 between video controller IC 200 and video DRAM, can be used to retrieve BIOS data from ROM BIOS 201.

Each memory data pin can support up to four loads. Since there is only generally one video memory interfaced with video controller IC 200, ROM BIOS 201 can be interfaced with video controller IC 200 through the DRAM data input MD0–MD63 without difficulty. Since ROM BIOS 201 is only eight bits wide, only eight bits of memory data interface MD0–MD7 are used. The video memory (202) may be interfaced using memory data interface MD0–MD63 without interference from ROM BIOS 201, as ROM BIOS 201 is only read during initialization.

In video controller IC 200, addresses are decoded from PCI bus AD0–AD31 and output enable /OE 203 is strobed to ROM BIOS 201 to enable reading of ROM BIOS 201. All the decoding and strobing that ROM BIOS 201 needs is done internally of video controller IC 200.

Figure 8:
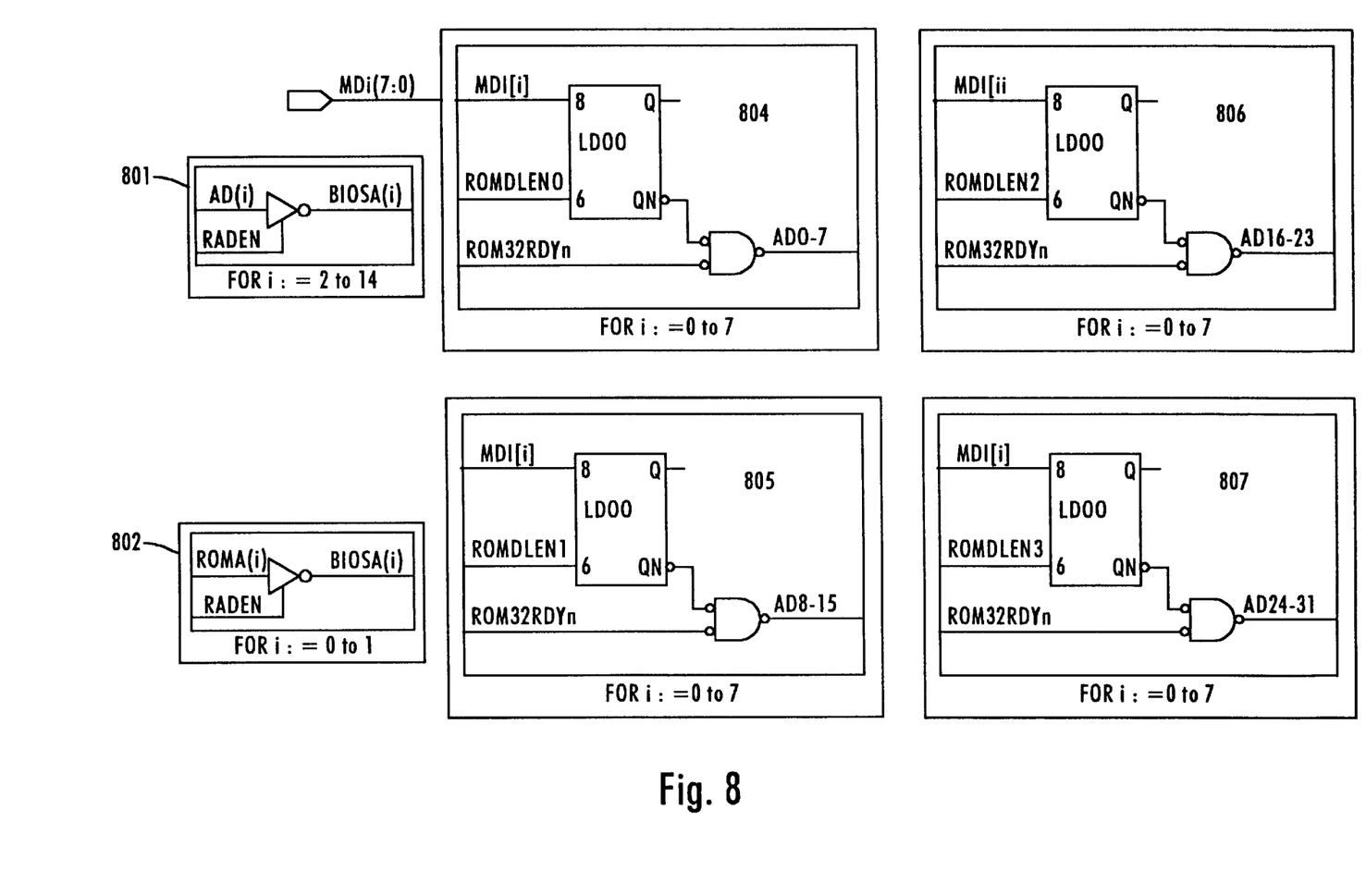
FIG. 8 is a circuit diagram showing the four memory latches for latching four bytes of data from the ROM BIOS and three address latches for converting PCI bus address data to ROM BIOS address data.

FIG. 8 shows two tristate buffers 801 and 802 used to generate addresses for ROM BIOS 201 from addresses received from PCI bus AD0–AD31. Each of the two tristate buffers 801 and 802 receives the read address enable signal RADEN to enable conversion of the PCI bus addresses to ROM BIOS addresses.

The ROM BIOS address is an address incremented from a starting value received over PCI bus AD0–AD31. The initial value is received over PCI bus AD0–AD31 and latched. This initial value is then incremented three times to produce four separate addresses for ROM BIOS 201, or however many bytes are needed to respond to the information request. Thirteen bits AD2–AD14 from PCI bus AD0–AD31 are used in latch 801 to latch the upper thirteen bytes BIOS A2 through BIOS A14. Latch 802 latches the lowest to address bits BIOS A0 and BIOS A1 which are received from a state machine as input ROMA(1) and ROMA(2). The state machine, shown in FIG. 5 and discussed below, generates four incremented latch addresses 00, 01, 10 and 11 so as to provide four separate byte addresses for ROM BIOS 201.

Figure 7:
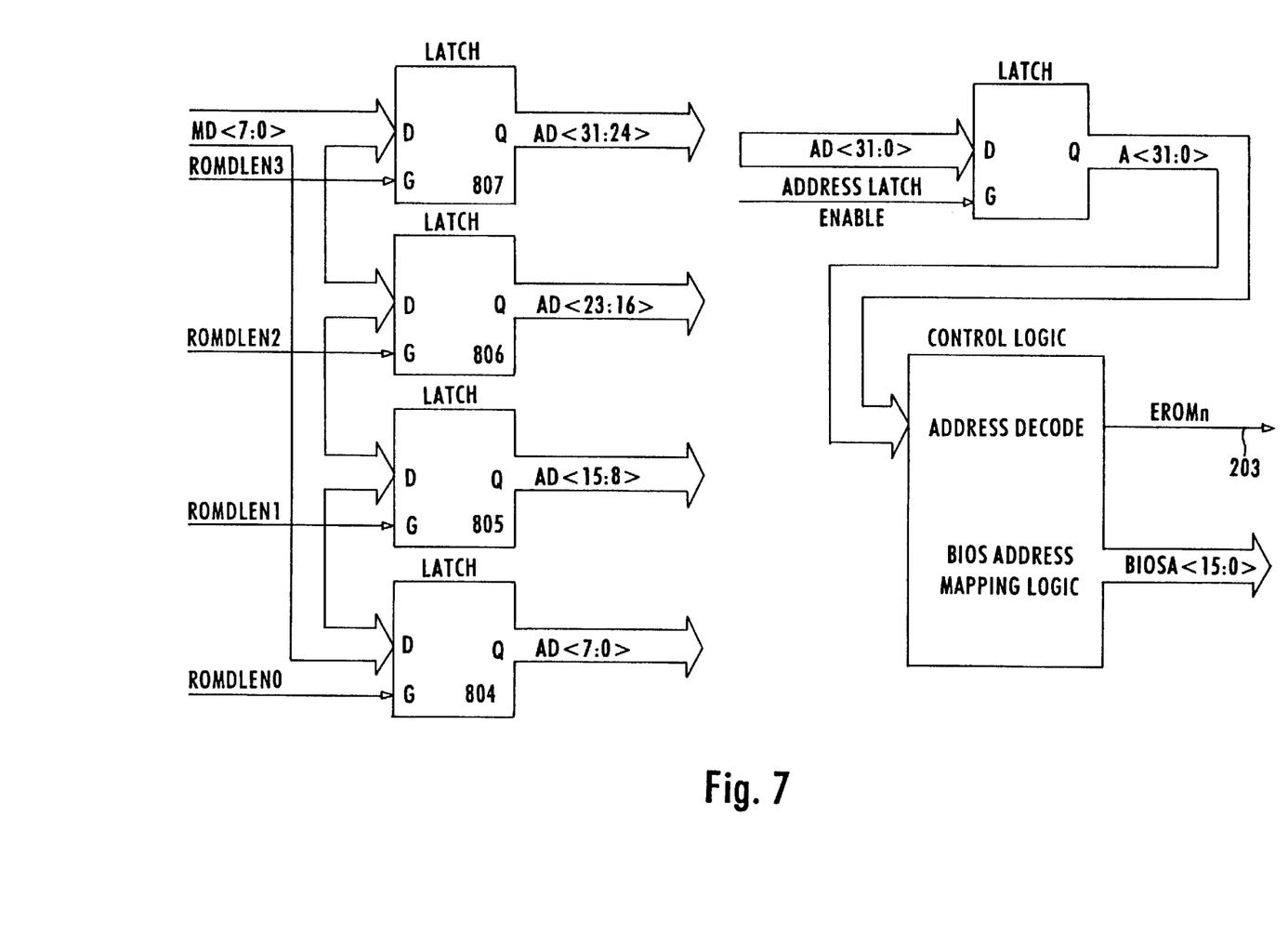
FIG. 7 is a block diagram showing the four byte latches for receiving memory data from the ROM BIOS and address latches for receiving address data for addressing a video memory or the ROM BIOS.

Data from ROM BIOS 201 is received from eight bit data bus MD0 through MD7 and input to memory data bus pins MD0 through MD7 on video controller IC 200. Video controller IC 200 is provided with 64 memory data pins MD0 through MD64. Of these, only pins MD0 through MD7 are coupled to ROM BIOS 201. FIGS. 7 and 8 show the latches 804–807 used to receive data from the PCI bus.

The data latches are shown in FIG. 8 as elements 804, 805, 806 and 807, which are eight bit latches that latch the data sequentially from the ROM BIOS 201.

The first byte will be latched in latch 804. The second byte is latched by latch 805. The third byte is latched in latch 806, and the fourth byte is latched in latch 807. Also shown in FIG. 8 are a series of gates. These gates transfer the addresses that are generated by the state machine in FIG. 5, and deliver the address to the address bus that goes out to ROM BIOS 201.

Figure 5:
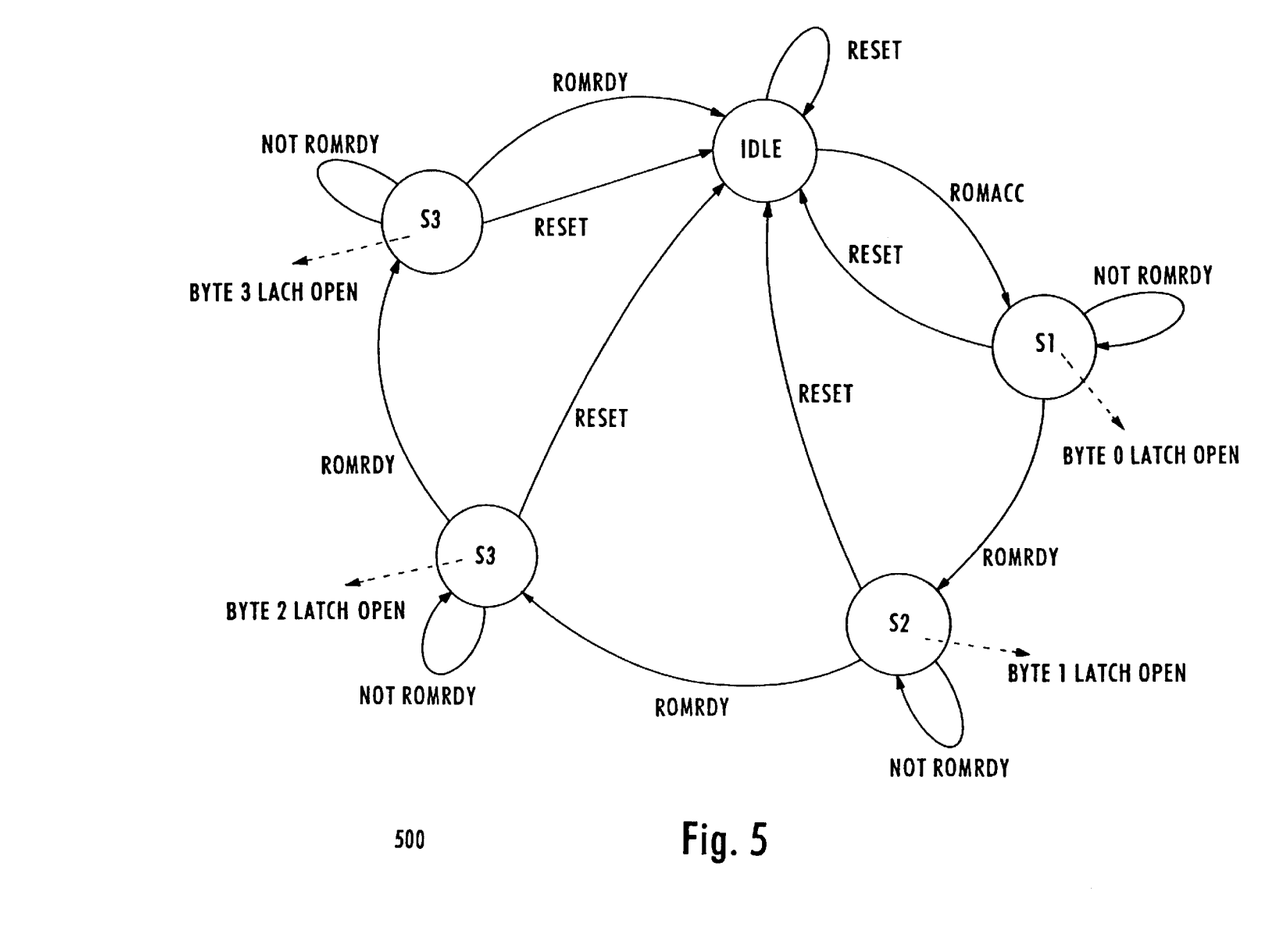
FIG. 5 is a state diagram of the second state machine of the present invention.

Internally, there is also a set of four latches and the logic of state machine shown in FIG. 5 sequentially reads through an 8 bit interface, four bytes sequentially, and assembles these four bytes to one double word of data.

The 32 bit word is then transferred to the PCI data bus through PCI data pins AD0–AD31 from video controller IC 200, and the bus cycle is terminated. Video controller IC 200 will then read a subsequent number of word locations and execute subsequent conversions, reading 4 bytes serially through 8 pins of the memory data bus assembling those 4 bytes into one single double word and presenting it to the PCI bus.

After 32 kilobytes have been read from ROM BIOS 201, the BIOS data has been transferred to the system memory of the host computer. If no further readings are required from ROM BIOS 201, the 8 data pins MD0–MD7 of memory data bus MD0–MD63 are now available for ordinary video memory function.

Figure 4:
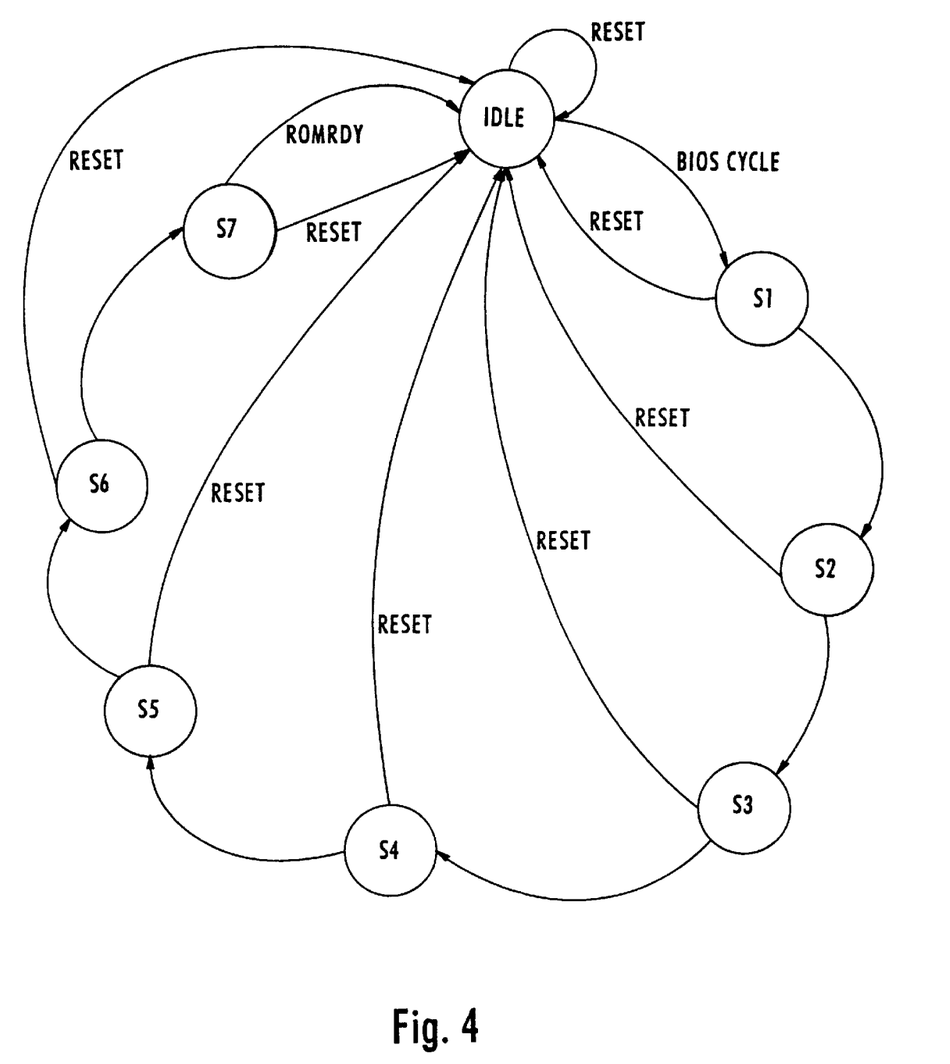
FIG. 4 is a state diagram of the first state machine of the present invention.

The control system to operate video controller integrated circuit 200 comprises two state machines shown in FIGS. 4 and 5. The first state machine, shown in FIG. 4, determines the amount of access time needed in order to stabilize the system and provide valid data. The second state machine, shown in FIG. 5, determines the number of bytes needed to respond to a memory request to ROM BIOS 201.

FIG. 4 shows the first state machine. This state machine comprises a counter which counts both clocks to determine a specified number of nanoseconds access time for ROM BIOS 201. For example, ROM BIOS 201 may comprise a 200 nanosecond EPROM. In other words, from the point that the addresses are determined valid, and the strobe to ROM BIOS 201 is valid, it takes 200 nanoseconds for the resultant data to be valid. The counter thus counts the number of clocks to allow enough time for the data to be valid.

In a normal mode of operation, the state machine of FIG. 4 remains at the IDLE step. Once a BIOS cycle has been initiated, processing passes to state S1, where it remains for a predetermined number of clock cycles before passing to state S2. At each state, a predetermined number of clock cycles are counted before passing to the next state. Thus, the state machine passes through sequential states S1–S7. If a RESET condition occurs, the state machine passes back to the IDLE state.

The slowest EPROM used for ROM BIOS 201 is typically on the order of 200 nanoseconds, and thus, a predetermined number of states S1–S7 are provided to accommodate a full range of EPROMS for use as ROM BIOS 201. Since ROM BIOS 201 is read only once (at power up or reboot) speed does not significantly affect the operation of the video controller.

The second state machine, shown in FIG. 5 detects how many bytes it actually has to read from ROM BIOS 201 to assemble enough data to give to the PCI bus. The second state machine matches the data and determines when the whole cycle is completed. The second state machine decides whether to acknowledge the CPU or keep processing until enough data is received from ROM BIOS 201.

As shown in FIG. 5, the second state machine is in the IDLE state until a ROM BIOS 201 access transfers the machine to state S1. The machine stays in state S1 until an eight bit word has been latched from ROM BIOS 201 and a ROM BIOS 201 ready signal transfers the machine to state S2. The process is repeated until all four bytes (or whatever number of bytes are programmed) are received, transferring the machine back to the IDLE state.

Video controller IC 200 uses its own reference clock to generate correct timing to ROM BIOS 201 so as supply the proper amount of address access time for the data before latching each of the individual bytes to assemble into one 32 bit word. ROM BIOS 201 is typically a fairly slow EPROM having 150 to 200 nanoseconds access time. Thus, the state machine 500 assembling 4 bytes into one double word also supplies correct timing by counting its own reference clock units and the bus clocks to make sure adequate access time is provided ROM BIOS 201.

State machine 500 generates the latching intervals based upon which byte is now currently being read. State machine 500 has the capability of starting on the non-aligned address. It is not necessary to start at 00; one can start at any point. The benefit of this feature is that on the PCI bus, access of 16 bit words, double words, or one byte may be retrieved and the controller will assemble the correct bytes and return the data.

In addition, state machine 500, while assembling 4 bytes into one single 32 bit transfer, also holds off the PCI bus transfer and terminates the bus transfer with the normal target: ready signal after the 4 bytes have been assembled. The PCI bus uses a ready signal that terminates all bus cycles. The PCI bus will initiate one 32 bit read. This 32 bit read is detected by video controller IC 200, and when valid data is received and assembled from ROM BIOS 201, video controller IC 200 acknowledges this ready condition with a target ready signal, called T-ready. The T-ready signal comes after 4 bytes have been read with correct timing. Thus, there is a delay time between the read request and T-ready.

T-ready is output by video controller IC 200 to PCI bus AD0–AD31 to inform the bus master, usually the host processor, that the transfer is complete.

The interface between video controller IC 200 and ROM BIOS 201 is designed such that no external buffers are required for the ROM BIOS 201. There is no need for any transceivers or any buffering for ROM BIOS 201. This is accomplished by actually delaying the last address strobe that enables ROM BIOS 201 and taking away the ROM enable /OE 203 a little early (about 60 nanoseconds early) such that by the time the data transferred from ROM BIOS 201 is shut off, the data can be received and another device can drive memory data bus MD0–MD63.

After the output enable /OE 203 is asserted to the ROM BIOS 201, it requires about 60 or 70 nanoseconds to shut off the ROM BIOS output drivers. The last output enable generated is removed about 60 nanoseconds early allowing the output drivers to shut off by the time the read cycle is terminated.

Figure 6:
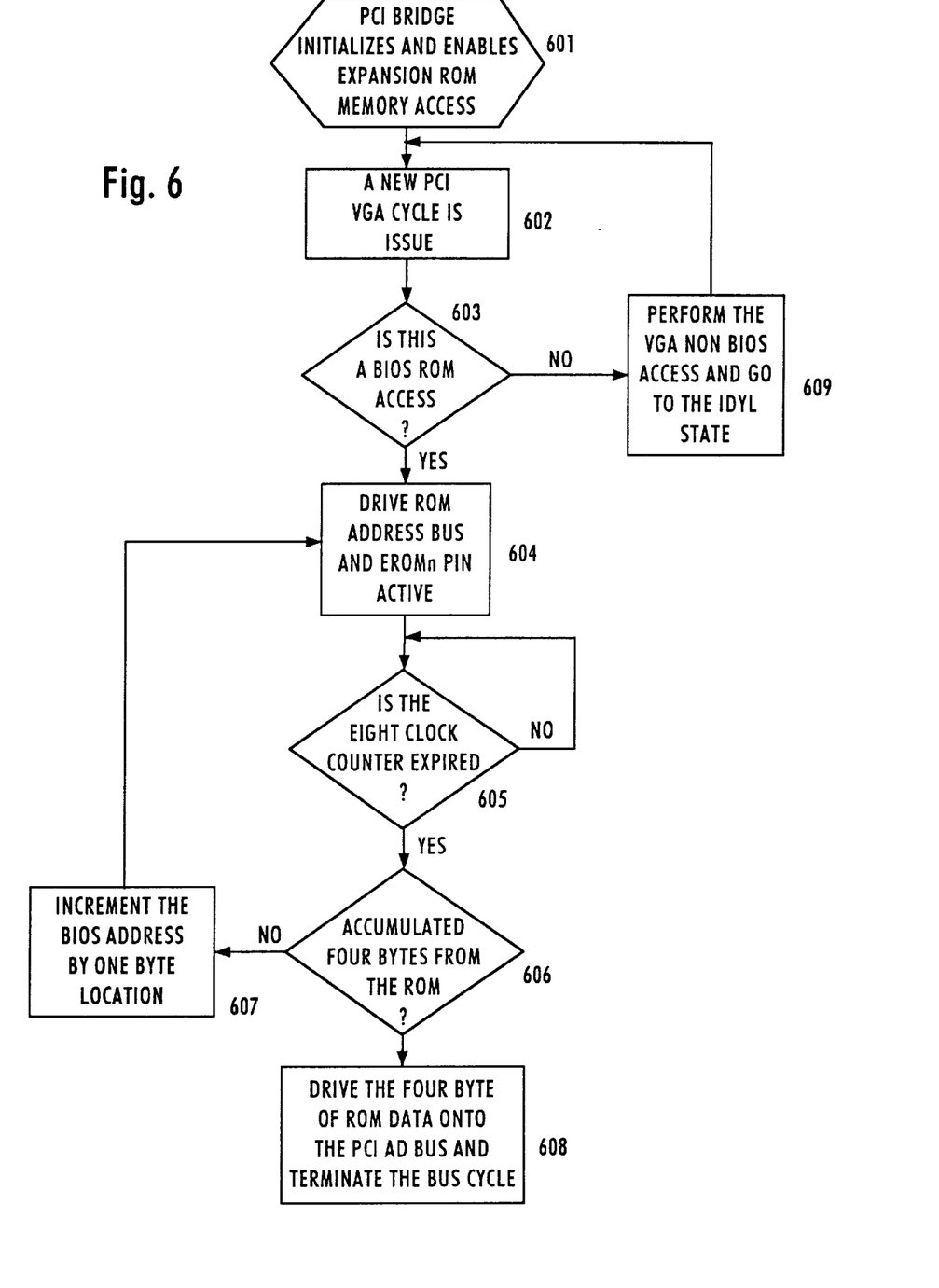
FIG. 6 is a flow chart of the process for accessing the ROM BIOS through the PCI bus.

FIG. 6 is a flowchart of the BIOS access process using the two state machines shown in FIGS. 4 and 5. In step 601, the PCI bridge in video controller integrated circuit 200 initializes and enables memory access to ROM BIOS 201. In step 602, a new PCI (32 bit) VGA cycles is issued. Step 603 determines whether this VGA cycle is a ROM BIOS access, as distinguished from, for example, a graphics command or the like. If ROM BIOS 201 is not to be accessed, processing passes to step 609 where the VGA cycle is completed.

If an access of ROM BIOS 201 is requested, processing passes to step 604. In step 604, the ROM BIOS 201 address bus is supplied with eight bits from the 32 bit address received over the PCI bus and the EPROM pin (output enable) 203 is active, (i.e., a strobe is generated along with an address to the ROM BIOS 201). In step 605, a wait cycle occurs. This wait cycle, as described in connection with the state machine of FIG. 4, may be however many clock cycles are required for the ROM BIOS 201 to retrieve the data. Six to eight CPU clock cycles, (depending on CPU clock speed), or up to 200 nanoseconds are examples.

In step 606, the cumulative data latched from the ROM is checked to determine whether enough data has been received to transmit over the PCI bus (e.g., four bytes). This amount could be four bytes, or the video controller may be configured to support different quantities, for example, by filling unused bytes with dummy data. If enough data has been accumulated, processing passes to step 608, and the ROM BIOS 201 data is driven to the PCI bus. If enough data has not been accumulated, the address provided to the ROM is incremented in step 607. and processing again passes to step 604. The process of step 606 is performed in the state machine of FIG. 5.

Thus, the object of the present invention to interface a ROM BIOS for a peripheral device with a local bus having a data width greater than the memory width of the ROM BIOS is fulfilled by latching the 8 bit data from the ROM BIOS and assembling this 8 bit data into a 32 bit double word and transmitting the double word on the PCI bus. In addition, the object of the present invention to provide an interface for a ROM BIOS for a peripheral device with a local bus such that the ROM BIOS is not presented as a load to the local bus is fulfilled by using the video controller IC as the sole load to the local bus and interfacing the ROM BIOS to the PCI bus through the video controller IC. The object of using the video controller as an interface is fulfilled by providing a portion of the memory bus for the video controller which interfaces the video controller with a video memory, with the ROM BIOS. Thus, the above described apparatus and method fulfill all of the objects of the present invention.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

For example, although the present invention is described in connection with the PCI bus format, the present invention also may be applied to other bus formats, where a ROM BIOS having a memory width less than the bus width needs to be accessed. Further, although the invention is described in terms of a peripheral device, application to other devices so as to allow a memory to output data to a bus having a data width greater than the memory width is possible.

We claim:

1. A computer peripheral device comprising:

a bus interface for interfacing with a local bus providing multiplexed address and data information to and from a processor, said bus interface having a predetermined bit width and providing a single load point for the computer peripheral device to the local bus;

a memory for storing BIOS information, said memory having a memory width less than said predetermined bit width of said bus interface; and a controller, coupled to said bus interface and said memory, for receiving BIOS information inquiries having a system address and a command multiplexed with the system address from said bus interface, retrieving BIOS information from said memory, assembling said BIOS information retrieved from said memory into a data string having a length equal to said predetermined bit width of said bus interface, and transmitting said data string to said bus interface.

2. The computer peripheral device of claim 1, wherein said memory comprises a EPROM having a memory width of eight bits.

3. The computer peripheral device of claim 1, wherein said bus interface comprises a PCI bus interface and said predetermined bus width comprises 32 bits.

4. The computer peripheral device of claim 3, wherein said controller provides to the local bus a single load for the computer peripheral device.

5. The computer peripheral device of claim 1, wherein said controller further comprises a first state machine for counting a number of clock cycles for said memory to retrieve said BIOS information.

6. The computer peripheral device of claim 5, wherein said controller further comprises a second state machine, coupled to said first state machine, for receiving a signal from said first state machine indicating BIOS information has been retrieved from said memory, and determining whether received BIOS information is responsive to said BIOS inquiry from said bus interface.

7. The computer peripheral device of claim 1, wherein the controller comprises an address generator outputting a plurality of BIOS addresses in response to the received system address.

8. The computer peripheral device of claim 7, wherein the memory receives the BIOS addresses sequentially and in response thereto outputs said BIOS information to the controller.

9. The computer peripheral device of claim 8, further comprising a DRAM memory data interface supplying the retrieved BIOS information from the memory directly to the controller.

10. The computer peripheral device of claim 9, wherein the controller outputs memory enable signals to the memory at intervals corresponding to the output of the respective BIOS addresses, a last of the memory enable signals having an enable interval reduced by a predetermined amount sufficient to enable data transfer by another device on the DRAM memory data interface upon the retrieval of the BIOS information by the controller from said memory.

11. A method of interfacing a memory having a predetermined memory width with a bus interface presenting a single load connection to a local bus providing multiplexed address and data information between a processor and the memory, the bus interface having a predetermined bit width greater than said memory width, said method comprising the steps of:

receiving an information request having a system address and a command multiplexed with the system address supplied by said local bus from said bus interface, retrieving at least a portion of requested information from said memory, determining whether all of the requested information responsive to the information request has been received from said memory, assembling the requested information retrieved from said memory into a data string having a length equal to said predetermined bit width of said bus interface, and transmitting said data string to said bus interface for transmission on said local bus.

12. The method of claim 11, wherein said bus interface comprises a PCI bus interface and said predetermined bus width comprises 32 bits.

13. The method of claim 11, wherein said memory comprises a EPROM having a memory width of eight bits.

14. The method of claim 11, wherein said step of receiving further comprises the step of determining whether the received information request requests BIOS information from said memory.

15. The method of claim 11, wherein said bus interface comprises a PCI bus interface and said local bus comprises a PCI bus.

16. The method of claim 11, wherein said determining step further comprises the step of counting a number of clock cycles for said memory to retrieve said BIOS information.

17. The method of claim 16, wherein said determining step further comprises the step of determining whether received BIOS information is responsive to said information inquiry.

18. The method of claim 11, wherein the retrieving step comprises the steps of:

generating a plurality of BIOS addresses from the information request;

successively outputting the BIOS addresses to the memory; and successively receiving the portions of requested information in response to the corresponding output BIOS addresses, respectively.

19. The method of claim 18, wherein said retrieving step further comprises the step of receiving the portions of requested information from said memory via a DRAM memory data interface.

20. The method of claim 19, wherein said retrieving step further comprises the step of outputting memory enable signals to the memory at intervals corresponding to the successive outputs of the BIOS addresses, respectively, a last of the memory enable signals having an access interval shortened by a predetermined interval to enable other devices to supply data on the DRAM memory data interface as a last of the portions of requested information is received.

21. A video controller for controlling a video display comprising:

a local bus interface providing a single load connection to a local data bus providing multiplexed address and data information to and from a processor, said local bus interface having a predetermined bit width;

a BIOS memory for storing BIOS information, said BIOS memory having a memory width less than said predetermined bit width of said local bus interface; and a controller, coupled to said local bus interface and said BIOS memory, for receiving BIOS information inquiries having a system address and a command multiplexed with the system address from said local bus interface, retrieving BIOS information from said BIOS memory, assembling said BIOS information retrieved from said BIOS memory into a data string having a length equal to said predetermined bit width of said local bus interface, and transmitting said data string to said local bus interface.

22. The video controller of claim 21, wherein said local bus interface comprises a PCI bus interface and said local data bus comprises a PCI bus.

23. The video controller of claim 21, wherein the controller comprises an address generator outputting a plurality of BIOS addresses in response to the received BIOS information inquiries.

24. The video controller of claim 23, wherein the BIOS memory receives the BIOS addresses sequentially and in response thereto outputs said BIOS information to the controller.

25. The video controller of claim 24, further comprising a DRAM memory data interface supplying the retrieved BIOS information from the BIOS memory directly to the controller.

26. The video controller of claim 25, wherein the controller outputs memory enable signals to the BIOS memory at intervals corresponding to the output of the respective BIOS addresses, a last of the memory enable signals having an enable interval reduced by a predetermined amount sufficient to enable data transfer by another device on the DRAM memory data interface upon the retrieval of the BIOS information by the controller from said memory.

27. A method of operating a video controller comprising the steps of:
receiving multiplexed address and data from a 32 bit local bus interface that interfaces the video controller through a single load connection to a local bus providing the multiplexed address and data,
determining whether the multiplexed address and data received from the 32 bit local bus interface comprises a BIOS information request,
responsive to said BIOS information request, retrieving from an eight bit wide BIOS memory at least one byte of BIOS information,
determining whether said at least one byte of BIOS information received from said BIOS memory contains all of the BIOS information responsive to the information request,
responsive to said BIOS information request from BIOS information into a data string having a 32 bit length, and
transmitting said 32 bit data string to said local bus interface.

28. The method of claim 27, wherein said local bus interface comprises a PCI bus interface and said data bus comprises a PCI bus.

29. The method of claim 27, wherein the retrieving step comprises the steps of:
generating a plurality of BIOS addresses from the BIOS information request;
successively outputting the BIOS addresses to the BIOS memory; and
successively receiving the bytes of BIOS information in response to the corresponding BIOS address.

30. The method of claim 29, wherein said retrieving step further comprises the step of receiving the bytes of BIOS information from said memory via a DRAM memory data interface.

31. The method of claim 30, wherein said retrieving step further comprises the step of outputting memory enable signals to the BIOS memory at intervals corresponding to the successive outputs of the BIOS addresses, respectively, a last of the memory enable signals having an access interval shortened by a predetermined interval to enable other devices to supply data on the DRAM memory data interface as a last of the bytes of BIOS information is received.

32. A computer system comprising:
a central processing unit;
a local bus having a predetermined bit width and multiplexing address and data information; and
a computer peripheral device comprising:
(1) a bus interface for interfacing with the local bus by providing a single load point for the computer peripheral device on said bus,
(2) a memory for storing BIOS information, said memory having a memory width less than said predetermined bit width of said bus interface; and
(3) a controller, coupled to said bus interface and said memory, for receiving BIOS information inquiries from said bus interface, retrieving BIOS information from said memory, assembling said BIOS information retrieved from said memory into a data string having a length equal to said predetermined bit width of said bus interface, and transmitting said data string to said bus interface.

33. A system as claimed in claim 32, wherein said controller provides to the local bus a single load for the computer peripheral device.

34. A system as claimed in claim 32, wherein the controller comprises an address generator outputting a plurality of BIOS addresses in response to the received system address.

35. A system as claimed in claim 34, wherein the memory receives the BIOS addresses sequentially and in response thereto outputs said BIOS information to the controller.

36. A system as claimed in claim 35, further comprising a DRAM memory data interface supplying the retrieved BIOS information from the memory directly to the controller.

37. A system as claimed in claim 36, wherein the controller outputs memory enable signals to the memory at intervals corresponding to the output of the respective BIOS addresses, a last of the memory enable signals having an enable interval reduced by a predetermined amount sufficient to enable data transfer by another device on the DRAM memory data interface upon the retrieval of the BIOS information by the controller from said memory.

* * * * *